US012580746B2

(12) United States Patent
Friesen et al.

(10) Patent No.: US 12,580,746 B2
(45) Date of Patent: Mar. 17, 2026

(54) METHOD FOR SECURELY NEGOTIATING SYMMETRICAL KEYS BETWEEN TWO PARTICIPANTS IN A COMMUNICATION

(71) Applicant: MERCEDES-BENZ GROUP AG, Stuttgart (DE)

(72) Inventors: Viktor Friesen, Karlsruhe (DE); Viktor Pavlovic, Stuttgart (DE); Philipp Weber, Tauberbischofsheim (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 83 days.

(21) Appl. No.: 18/840,223

(22) PCT Filed: Jan. 20, 2023

(86) PCT No.: PCT/EP2023/051380
§ 371 (c)(1),
(2) Date: Aug. 21, 2024

(87) PCT Pub. No.: WO2023/160916
PCT Pub. Date: Aug. 31, 2023

(65) Prior Publication Data
US 2025/0184122 A1     Jun. 5, 2025

(30) Foreign Application Priority Data
Feb. 22, 2022     (DE) ..................... 10 2022 000 638.3

(51) Int. Cl.
*H04L 9/08*          (2006.01)
*H04L 9/14*          (2006.01)
(52) U.S. Cl.
CPC ............ *H04L 9/083* (2013.01); *H04L 9/0869* (2013.01); *H04L 9/0891* (2013.01)

(58) Field of Classification Search
CPC ..... H04L 9/083; H04L 9/0869; H04L 9/0891; H04L 2209/84; H04L 9/14; H04L 9/0861; H04L 9/085; H04L 9/088
See application file for complete search history.

(56)               References Cited

U.S. PATENT DOCUMENTS 9,385,862 B2 *  7/2016  Escott ................. H04W 12/069
10,936,744 B1 *  3/2021  Trepetin ............. H04L 63/0421
(Continued)

FOREIGN PATENT DOCUMENTS

DE       102016106602 A1    10/2017
DE       102020003739 A1    10/2020
WO         2017178201 A1    10/2017

OTHER PUBLICATIONS

ETSI; "Quantum-Safe Virtual Private Networks; [Cyber-QSC Verion 0.0.5 Release 0];" ETSI TR 1DD DDD V0.0.5; Apr. 2018; pp. 1-40.
(Continued)

*Primary Examiner* — Darren B Schwartz
(74) *Attorney, Agent, or Firm* — PATENT PORTFOLIO BUILDERS PLLC

(57)               ABSTRACT

A method for securely negotiating symmetrical keys between at least two participants of a communication involves each of the participants being equipped in pairs with a common secret or can be equipped indirectly via a further participant, which respectively shares a common secret with each other the two other participants. The participants are each equipped in pairs with at least one common key derivation function or can thus be equipped indirectly via the further participant. If a symmetrical key or the renewal of a symmetrical key is needed, it is derived based on the common secret and one of the key derivation functions according to a derivation rule, which includes at least the key derivation function to be used and at least one
(Continued)

Equip Participants in Pairs with Common Secret — 110

Determine New or Renewed Symmetrical Key Required — 120

Derive New or Renewed Symmetrical Key Based on the Common Secret and a Key Derivation Function According to a Key Derivation Rule — 130 parameter for the key derivation function and is communicated to one of the participants by the other participant.

15 Claims, 1 Drawing Sheet

(56)                    References Cited

U.S. PATENT DOCUMENTS

| 10,938,555 | B2 | 3/2021 | Foerder | |
| 10,958,424 | B1* | 3/2021 | Chhabra | H04L 9/083 |
| 11,212,090 | B1* | 12/2021 | Griffin | H04L 63/067 |
| 2006/0101270 | A1* | 5/2006 | Laitinen | H04L 9/321 |
| | | | | 713/176 |
| 2008/0037785 | A1* | 2/2008 | Gantman | H04L 9/0872 |
| | | | | 380/278 |
| 2011/0261961 | A1* | 10/2011 | Dharmaraju | H04W 12/041 |
| | | | | 380/277 |
| 2013/0275757 | A1* | 10/2013 | Harrington | H04L 9/0662 |
| | | | | 713/171 |
| 2016/0132699 | A1* | 5/2016 | Miller | H04L 9/085 |
| | | | | 713/193 |
| 2019/0097982 | A1* | 3/2019 | Bhattacharyya | H04L 9/14 |
| 2020/0221297 | A1* | 7/2020 | Hu | H04W 12/041 |
| 2020/0280436 | A1 | 9/2020 | Nix | |
| 2022/0038283 | A1* | 2/2022 | Vermeulen | H04L 63/08 |
| 2023/0308424 | A1* | 9/2023 | Nix | H04L 9/3242 |

OTHER PUBLICATIONS

International Search Report and Written Opinion mailed Apr. 20, 2023 in related/corresponding International Application No. PCT/EP2023/051380.
Office Action created Feb. 8, 2023 in related/corresponding DE Application No. 10 2022 000 638.3.

* cited by examiner

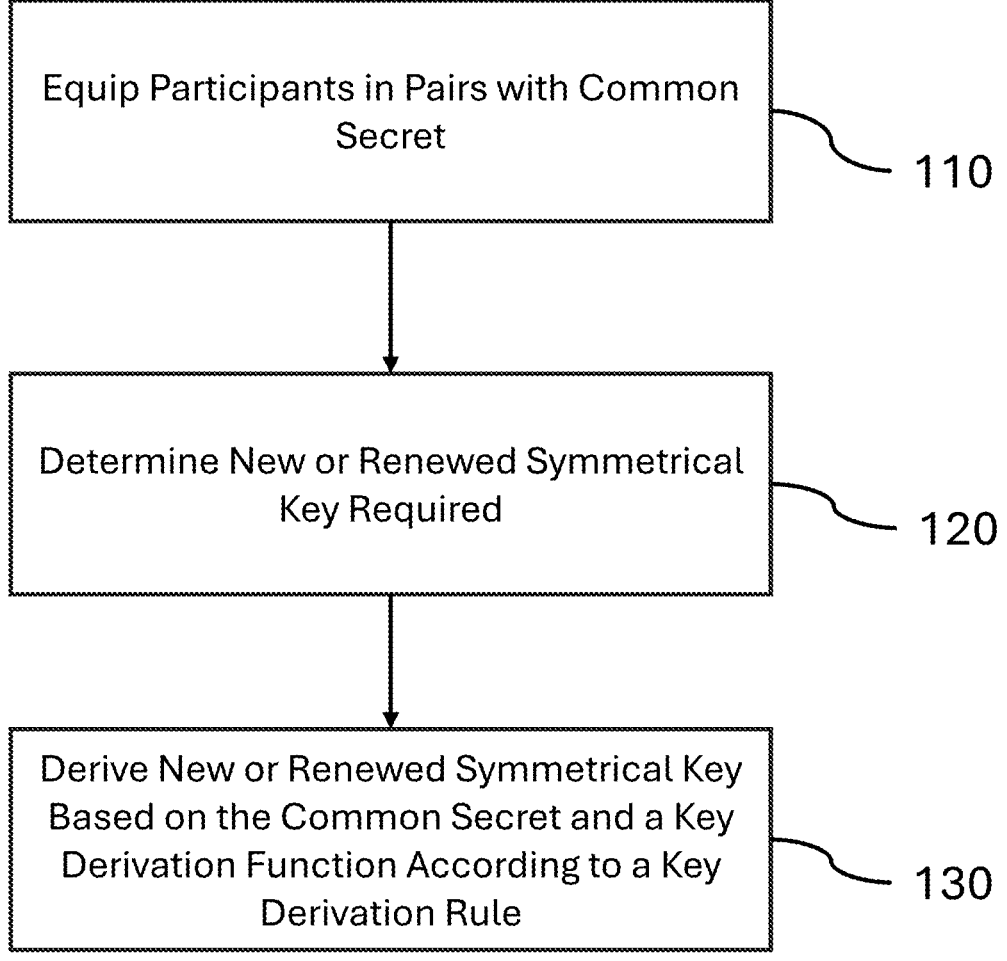
Equip Participants in Pairs with Common Secret — 110
Determine New or Renewed Symmetrical Key Required — 120
Derive New or Renewed Symmetrical Key Based on the Common Secret and a Key Derivation Function According to a Key Derivation Rule — 130

METHOD FOR SECURELY NEGOTIATING SYMMETRICAL KEYS BETWEEN TWO PARTICIPANTS IN A COMMUNICATION

BACKGROUND AND SUMMARY OF THE INVENTION

Exemplary embodiments of the invention relate to a method for securely negotiating symmetrical keys between two participants in a communication.

Modern vehicles are characterized by increased networking. Here, the vehicles are not only connected to systems such as the World Wide Web, but also to systems and servers operated by the vehicle manufacturer or OEM, for example the manufacturer's own applications or a manufacturer's own server, which is also often referred to as the vehicle backend. These are developed, marketed, and operated by the manufacturer exclusively for their own fleet of vehicles. Together, all this is also referred to as the vehicle ecosystem.

In practice, it is now such that a plurality of new interfaces and applications emerge as a result of the varied communication relations between the individual system components within such a vehicle ecosystem, all of which has to be secured using suitable cryptographic methods, such as mechanisms, protocols, etc., for example. On one hand, securing serves to preserve the privacy of the vehicle user and, on the other hand, to not allow any external engagement in the data traffic, which could be used by hackers, in particular when transferring data which relates to the vehicle control, in order to seize the vehicles and manipulate important functions.

Here, current practice is the use of asymmetrical keys or methods based on asymmetrical cryptography. There are typically used in the form of the so-called TLS (transport layer security), sometimes also IPSec (internet protocol security), which for their part use conventional asymmetrical methods, such as e.g. the RSA or ECC (elliptic curve cryptography) based on prime number partition.

The typically used, asymmetrical cryptographic methods, such as ECC or RSA, for example, here have the advantage that, according to the current status, they offer a relatively secure securing with minimal effort. However here, all these methods are based on cryptographic algorithms, the security of which is not regarded as robust in the face of quantum computers. Due to the way they calculate, quantum computers are capable of breaking asymmetrical cryptographic methods and decrypting secured data within a very short amount of time. The methods typically used today for the communication between vehicle and backend for cryptographic securing, i.e., in particular for encoding and/or authenticating, are then no longer secure. This so-called post-quantum threat was, up until now, a more theoretical threat, since quantum computers were only regarded as pure research instruments and could only be implemented with great effort. However, in recent years, the development of quantum computers has clearly accelerated. A reliable forecast that sufficiently powerful quantum computers will not be commercially available on the market in the next ten years can thus no longer be guaranteed from today's perspective.

Vehicles that come onto the market today are generally on the road for 10 to 15 years. This means that the post-quantum threat, i.e., the potential possibility, of quantum computers easily or, in particular, commercially available easily breaking the conventional asymmetrical cryptographic securing at a later point in time is already relevant to vehicles to be shipped today. The communication of a communication device of the vehicle with the external server, which today is usually secured with cryptographic protocols based on RSA or ECC would thus no longer be secure if this post-quantum threat were to occur, such that a secure communication cannot be guaranteed from today's perspective for the entire expected working life of the vehicles. This threat is particularly grave for systems that cannot readily be upgraded or updated. For example, for the electronic control devices installed in vehicles (ECU: Electronic Control Unit). This is simpler with servers, smartphones or similar, which can, generally, also be enhanced much more quickly with regard to their hardware or have a shorter assumed lifetime than vehicles.

In order to meet the post-quantum threat, asymmetrical algorithms that are resistant to the post-quantum threat have been the subject of general research for several years. These are the approaches usually referred to as post-quantum cryptography or PQC. However, these are not yet very sophisticated, such that today they are still not suitable for replacing the asymmetrical conventional methods. Thus, today's vehicles cannot yet be designed with post-quantum-capable cryptographic securing methods, since such techniques are not yet sophisticated enough for a conclusive assessment of the expected security to be possible. Moreover, up to now there has been no standardization, and the approaches have a high resource requirement. A hasty changeover to such quantum-computer-resistant cryptographic methods is thus neither sensible nor simply possible at the present point in time. If there were already a standardized PQC method regarded as sufficiently secure, then it would not make sense to implement such a method in the current communication devices of vehicles, since higher costs and a high resource consumption would stand in the way of cost efficiency in the current vehicle ecosystem.

Furthermore, it is such that symmetrical methods, such as AES (Advanced Encryption Standard), for example, or hash methods, such as SHA-512 (Secure Hash Algorithm), for example, or also symmetrical authentication methods, such as HMAC (Hashed Message Authentication Code), for example, are not fundamentally affected, according to the current state of knowledge, by the post-quantum threat. According to the current state of knowledge, the security of these methods would indeed be halved should the post-quantum threat materialize, such that a 128-bit key still provides 64-bit security after quantum computers become available. Such a weakening, however, can be compensated for relatively easily by increased key lengths.

Compared to asymmetrical methods, it is such that such symmetrical methods have the great problem that, in the symmetrical cryptographic methods, the distribution and the negotiation of keys are difficult to handle, in particular due to their potentially very high numbers. In particular, this relates to equipping the concerned components with initial symmetrical keys, so-called provisioning. Moreover, it relates to the, in particular, demand-driven negotiation of, in particular common, symmetrical keys or session keys between two or more communication partners, which are not in possession of a common symmetrical key, which thus do not or do not yet "know" each other. Furthermore, for each component with which a communication relation already existed and a common symmetrical key has already been agreed, these must be correspondingly stored. Due to the typically occurring very high number of communication relations, managing the symmetrical keys in one component is extremely laborious.

For this reason, it is provided, for example with TLS when negotiating symmetrical keys between the communication partners to use asymmetrical cryptographic methods based on certificates. If the symmetrical keys are negotiated using such methods, then it is also authenticated and encrypted exclusively symmetrically with TLS. Negotiating using asymmetrical cryptographic methods themselves is not post-quantum resistant, as explained above.

DE 10 2020 003 739 A1 describes a method for distributing and negotiating key material within a vehicle ecosystem, in which a central confidential authority or Trust Authority is established, the involved participants are initially equipped with individual secrets, by means of which they can communicate with the Trust Authority in a protected manner and, if required, can retrieve shared keys for participant groups from the Trust Authority in a protected manner.

The disadvantages of this method are that all negotiated shared secrets have to be generated by the Trust Authority and then have to be transferred to the individual participants and that thus for each participant, both an authentication method and an encryption method have to be implemented with the Trust Authority to securely transfer these secrets. However, it can occur that the possibilities of a participant equipped with minimal resources are not sufficient for implementing and sensibly using both a secure authentication method and a secure encryption method. This applies, in particular, for control devices in vehicles which often have rather limited resources in terms of the freely available computational power and memory capacity.

Exemplary embodiments of the invention present are directed to an improved method for distributing and for negotiating key material, in particular within a vehicle ecosystem.

BRIEF DESCRIPTION OF THE SOLE DRAWING

The sole drawing illustrates an exemplary method according to embodiments of the invention.

DETAILED DESCRIPTION

The sole drawing illustrates an exemplary method according to embodiments of the invention. Participants are equipped in pairs with a common secret (step 110), it is determined whether a new or renewed symmetrical key is required (step 120), and if so the new or renewed symmetrical key is derived based on the common secret and according to a key derivation function according to a key derivation rule (step 130). Additional details of the method are discussed below.

The method according to the invention is substantially based on above-mentioned DE 10 2020 003 739 A1, and it provides that all participant pairs $TN_i$, $TN_j$ of a communication system, which, in particular, can be part of a vehicle ecosystem, are equipped with a shared and thus common secret $SEC_{TNi}^{TNj}$ of sufficient length and entropy. The common secrets $SEC_{TNi}^{TNj}$ can here be used as initially shared secrets $SEC_{TNi}^{TNj}$, which, however, with very high numbers of participants $TN_i$, quickly becomes very resource intensive. Alternatively, they can thus be exchanged as needed between two participants $TN_i$, $TN_j$ via a further participant $TN_k$, whom both know and trust or who has already communicated with them both before. According to a very advantageous development of the method according to the invention, this further participant can be a confidential authority or Trust Authority TA corresponding to DE 10 2020 003 739 A1. The communication could also take place directly between only one participant $TN_i$ and the Trust Authority TA, wherein then an initially shared secret $SEC_{TNj}^{TA}$ is necessary.

According to the invention, with the method it is such that, in contrast to the prior art in the form of DE 10 2020 003 739 A1, all secrets used for securing the communication between $TN_i$ and $TN_j$ by these participants $TN_i$, $TN_j$, for example symmetrical keys, can then be derived from this common secret $SEC_{TNi}^{TNj}$ as needed. Thus, this shared secret $SEC_{TNi}^{TNj}$ serves as the central if not even the single "secret entropy source" for securing the communication between the respective participants $TN_i$, $TN_j$.

For this, each participant $TN_i$ implements at least one secure key derivation function KDF known to the other participant $TN_j$ of the communication or the Trust Authority TA, if this is the other participant $TN_k$. In particular, this can be based solely on secure one-way functions, such as hash functions. This can also be initially implemented, like the shared secret, or can be provided or shared via the further participant.

If a new key is required for securing the communication between the two participants $TN_i$, and $TN_j$ or $TN_i$ and the TA, be that for a new purpose, i.e., for example a First Communication, or due to a renewal of a lapsed key relating to an already known purpose, then a derivation rule DR is communicated to one of the participants $TN_i$ by the other of the participants $TN_i$ or the Trust Authority TA (or also vice versa). This derivation rule DR here comprises at least the information as to which of the key derivation functions is to be used if several are present and passes over at least one parameter to the key derivation function itself.

Based on this, a symmetrical key for cryptographically securing the shared secret $SEC_{TNi}^{TNj}$ can then be derived simply and efficiently. This can then be used for authenticating and/or encrypting. With an initially shared secret, this key negotiation can here be carried out with only one single message to be conveyed. Here, according to a very advantageous development of the method according to the invention explained in yet more detail later, this can comprise the contents of the message—yet not the derivation rule DR—in encrypted form. However, the entire message can be authenticated.

Here, the advantages of the method according to the invention are, above all, that:
- a symmetrical key that is thus resistant to post-quantum according to today's understanding can be negotiated simply and efficiently;
- the method can, particularly advantageously, already be used today in vehicle control devices, since more and more vehicle control devices have a secure hardware module (HSM) in which a shared secret can be securely saved, and the secure initial introduction of individual secrets into the control devices by the control device manufacturers is already well-established today.

According to a very favorable design of the method according to the invention, it can here be provided that the key derivation function KDF uses a key base KDF-key, a salt KDF-salt, and an output length KDF-length as parameters, wherein the key base KDF-key is the secret, which flows directly into the key derivation function KDF for the derivation of the key, wherein the salt KDF-salt is a coincidental or pseudo-coincidental bit string of a predetermined length, and wherein the output length KDF-length is a natural number, which specifies the length of the symmetrical key to be compiled.

The derivation rule is used to inform the corresponding participant $TN_i$ (or $TN_j$) which bits of the common secret $SEC_{TNi}^{TNj}$ are to be used for forming the key base KDF-base and in which order they are to be arranged for this. The key base KDF-key ascertained in this way is then used for generating the new key with KDF. Furthermore, the corresponding participant $TN_i$ (or $TN_j$) is informed which salt is to be used for the key generation and which length KDF-length is to have the output of the key derivation function KDF.

An advantageous development of the method according to the invention provides that the derivation rule DR comprises the key derivation function KDF to be used, the salt KDF-salt, the output length KDF-length and, in each case, an input and/or output selection function SeqPosIn, SeqPosOut. The input selection function SeqPosIn serves to determine using "bit selection" the key base KDF-key from the secret SEC. The key base KDF-key itself is here not part of the derivation rule DR since the key base is secret and the derivation rule DR is transferred without encryption.

Thus, one of the participants $TN_i$ can now be informed by the other participant $TN_j$ or the Trust Authority TA, if this is the second participant, of a derivation rule DR for the new key taking the parameters and one or both of the selection functions SeqPosIn, SeqPosOut into consideration. This derivation rule can contain at least the following information:

- the key derivation function KDF to be used, which depends on the parameters KDF-key, KDF-salt and KDF-length;
- the definition of bit string KDF-key depending on $SEC_{TNi}^{TNj}$ by specifying an input selection function Seq-PosIn, which defines which bits of the secret $SEC_{TNi}^{TNj}$ in which order are to form the KDF-key;
- the bit string KDF-salt;
- the natural number KDF-length;
- the definition of the bit string depicting the new derived key $DR(SEC_{TNi}^{TNj})$ depending on the output of the key derivation function KDF by specifying an output selection function SeqPosOut, which defines which bits of the output of the key derivation function KDF in which order are to define the new derived key $DR(SEC_{TNi}^{TNj})$.

Thus, a derivation rule DR is clearly described e.g., by a tuple of the following form:

DR=(KDF, SeqPosIn, KDF-Salt, KDF-Length, SeqPosOut).

The key clearly set by a derivation rule DR defined in such a way and the shared secret $SEC_{TNi}^{TNj}$ is labelled with $DR(SEC_{TNi}^{TNj})$ and is defined by $DR(SEC_{TNi}^{TNj})$: =SeqPosOut (KDF(SeqPosIn($SEC_{TNi}^{TNj}$), KDF-Salt, KDF-Length)).

Here, the input selection function SeqPosIn is a function that selects bits determined from bit strings of the length $L(SEC_{TNi}^{TNj})$ and newly arranges these selected bits as appropriate (in this document L(bf) refers to the bit length of a bit string bf). Analogously, output selection function SeqPosOut is a function that selects bits determined from bit strings of the length LDF-length and newly arranges these selected bits as appropriate.

Here, a selection function can newly arrange the bits selected from the input bit string or maintain their original relative order in relation to one another. The first rearranged variant of a selection function offers more flexibility with the definition of a selection function; in this way more selection functions can be defined; the description of selection function rearranging the bits, however, thus contains more information and requires more space in the derivation rule DR. The second variant, which avoids a rearrangement of the selected bits, is less flexible and strong, yet requires less space in the derivation rule DR. Since the length of the shared secret $SEC_{TNi}^{TNj}$ is fixed, assuming that each bit is selected from $SEC_{TNi}^{TNj}$ at most once by the input selection function SeqPosIn, the number of LDF-keys, which can be selected by means of the input selection function SeqPosIn from the secret $SEC_{TNi}^{TNj}$ is limited; it may be that not every conceivable KDF-key of a predetermined length can be selected from $SEC_{TNi}^{TNj}$ by means of SeqPosIn. Therefore, in particular in the case of SeqPosIn, it can be meaningful to enable a rearrangement of the selected bit by SeqPosIn. Since SeqPosOut selects the bits from the output of the key derivation function KDF and the length of this output is determined by the freely selectable parameter KDF-length, the DR parameter KDF-length is chosen for each key derivation function and each desired output chosenKey in such a way that chosenKey can be defined by an order-preserving selection function SeqPosOut, such that chosenKey=$DR(SEC_{TNi}^{TNj})$ applies.

Here, a selection function can be defined in various ways. Several conceivable are described below:

Variant 1

It is proposed to describe a rearranging selection function using a sequence of bit positions (pos_0, . . . , pos_(n−1)), wherein n is the length of the output of the selection function and the individual positions pos_j are smaller than the length of the input and different from one another in pairs, e.g. with the input bit strong 00001111 and n=4, the output bit string 0101 is defined or encoded by the selection function (0, 5, 2, 7).

Variant 2.1

It is proposed to describe an order-preserving selection function using a sequence of distances (dist_0, . . . , dist(n−1)), wherein n is the length of the output of the selection function, dist_0≥0 applies, for the remaining distances, i.e. for 0<j<n, dist_j>0 applies, and the sum of all distances is smaller than the length of the input. For example, with the input bit string 00001111 and n=4, the output bit string 0011 is defined or encoded by the selection function (0, 3, 2, 2). It is noted that with the same input bit string, the bit string 0101 cannot be defined by an order-preserving selection function.

Variant 2.2

Expanding on this, it is furthermore proposed to describe an order-preserving selection function using a sequence of sections, wherein a section is described either by a single distance dist_j or by a distance pair (dist_j, dist_k). Here, a single distance represents a section consisting of a bit position, while a distance pair (dist_j, dist_k) (dist_k+1) represents cohesive bit positions, wherein dist_0≥0 applies, for the remaining distance, i.e., for 0<j<n, dist_j>0 applies, and the sum of all distances is smaller than the length of the input, e.g. with the input bit string 00001111 the output bit string 00111 is defined or encoded by the selection function (0, (3, 2), 2).

Variant 3

Furthermore, it is proposed to describe an order-preserving selection function using a bit string (bit_0, . . . , bit_(le−1)), wherein le does not exceed the length of the input of the selection function, i.e. le≤$L(SEC_{TNi}^{TNj})$ in the case of SeqPosIn and le≤KDF-length in the case of SeqPosOut. Here, bit_j=1 (for 0≤j≤le−1) indicates that the bit in position bit_j of the input of the selection function belongs to its output, and bit_j=0 indicates that the bit in position bit_j of the input of the selection function does not belong to its output.

The variants described can also be combined with one another by individual bits being selected by means of variant 1 or variant 3 e.g. from a cohesive region of $SEC_{TNi}^{TNj}$ defined by means of variant 2.2, wherein, in the case of variant 1, the selected bits are rearranged as needed.

Each of the variants of the definition of selection functions has its advantages and disadvantages. In particular, it can be meaningful to use different definitions for SeqPosIn and for SeqPosOut.

A very favorable design of the method can further provide that the derivation rule DR is transferred without at least one of the input and/or output selection functions SeqPosIn, SeqPosOut, wherein, instead of transferring at least one of the selection functions SeqPosIn, SeqPosOut, a reference is transferred to a common known input and/or output selection function SeqPosIn, SeqPosOut.

The selection functions SeqPosIn, SeqPosOut therefore do not have to be described in full every time as part of the derivation rule DR, but rather instead of a full description, a derivation rule DR can also contain a reference to a selection function SeqPosIn, SeqPosOut known to the two participants $TN_i$, $TN_j$ of the communication by e.g., a clear name of the selection function to be used together with the values of the parameters required by this, as needed, being specified.

In an advantageous design of the method according to the invention, different regions of the common secret can be used by means of different input selection functions. Thus, the derivation rules can use the shared secret optimally and across its entire length by means of the different input selection functions.

The secrets $SEC_{TNi}^{TNj}$ can thus be used in such a way that a separate bit block or bit region of the secret $SEC_{TNi}^{TNj}$ is used for each foreseeable purpose, such that if information about the underlying key base KDF-key could be obtained when using a derived key, only this one region of the secret $SEC_{TNi}^{TNj}$ provided for this purpose would be corrupted. This introduction of $SEC_{TNi}^{TNj}$ into separate regions can be implemented particularly efficiently by means of the selection function described above in variant 2.2, here as input selection function SeqPosIn.

Furthermore, it can be meaningful to constantly choose the input selection functions SeqPosIn_j of the derivation rule DR_j using the secret $SEC_{TNi}^{TNj}$ in such a way that the individual bits of a secret $SEC_{TNi}^{TNj}$ individual to the participant are used in a "uniformly distributed" manner by these derivation rules DR_j in the sense that, at each point in time, the individual bits of the secret $SEC_{TNi}^{TNj}$ are used by almost the same number of derivation rules previously used for key derivation. Thus, #u refers to the number of derivation rules or selection functions in which the bit in position u of the secret $SEC_{TNi}^{TNj}$ contributes to the formation of the KDF-key_J, thus at each point in time, it applies that, for two random bit positions u, k with $0 \leq u < k < L$ ($SEC_{TNi}^{TNj}$), $|\#u - \#k| \leq 1$, wherein $|.|$ refers to the absolute distance between two numbers.

Furthermore, it can be meaningful to constantly choose the input selection functions SeqPosIn_l of the derivation rules DR_l using the secret $SEC_{TNi}^{TNj}$ in such a way that the key bases KDF-key_I of the individually derivation rules DR_l intersect in pairs in about the same number of positions. Thus, if DR_1, . . . , DR_n are the individual derivation rules and SeqPosIn_1, . . . , SeqPosIn_n the corresponding input selection functions and if, for two selection functions SeqPosIn_l SeqPosIn_k, #∩(SeqPosIn_l, SeqPosIn_k) denotes the number of bit positions selected both by SeqPosIn_l and by SeqPosIn_k, then, if possible for any l1, k1, l2, k2 with l1≠k1, l2≠k2, $|\#∩$ (SeqPosIn_l1, SeqPosIn_k1)$-\#∩$(SeqPosIn_l2, SeqPosIn_k2)$| \leq 1$ should always apply.

The two properties above are achieved better and better in the long run, i.e., when n is high, with a probability that increases with n when a random number generator or a pseudo-random number generator is used for selecting the bit positions selected by the input selection functions SeqPosIn_l, which randomly sets the bit positions described by SeqPosIn_l for each derivation rule DR_l.

The output selection function SeqPosOut serves to be able to explicitly shape or form the value of the derived key $DR(SEC_{TNi}^{TNj})$. This also makes it possible to transfer each random previously set bit string bf* in a trusted manner to the receiver as $DR(SEC_{TNi}^{TNj})$ by means of a suitable choice of the output length KDF-length and the adjusted output selection function SeqPosOut. For this, exactly those bits bf that yield the set bit string bf* are selected from a sufficiently long bit string bf, which is the result of the derivation rule DR before using the output selection function SeqPosOut. Thus, a derivation rule can, if needed, also be used as an encryption method (which is not particularly efficient in terms of the space required in the message but is secure) without a conventional encryption method being used here. This encryption method is inspired by the well-known book encryption in which character strings are encoded as page and word and character numbers of a previously agreed book as a "common secret". As there, it is possible to transfer the same fixed bit string bf* to different participants despite two different secrets with different participants. This only requires one length specification KDF-length adjusted to the respective secret bf* and an output selection function adjusted to bf*.

The encryption method is secure against passively reading along because KDF is a secure one-way function. As a result of the singularity of the salt value, with each use of KDF with a sufficiently large KDF-length, a singular value is generated for KDF(SeqPosIn($SEC_{TNi}^{TNj}$), KDF-Salt, KDF-Length) which ensures that even for the same secrets $DR(SEC_{TNi}^{TNj})$ to be transferred, different selection functions SeqPosOut are used.

With the definition of a derivation rule DR, the specification of a selection function or the two selection functions SeqPosIn, SeqPosOut can also be completely dispensed with. If the specification of SeqPosIn is dispensed with, then the whole shared secret $SEC_{TNi}^{TNj}$ is used as the input for the key derivation function KDF. If the specification of SeqPosOut is dispensed with, then all KDF-length bits of the output of the key derivation function KDF are used as the result $DR(SEC_{TNi}^{TNj})$.

The method described can be used to give two participants $TN_i$ and $TN_j$ that do not know each other, i.e., have no shared key, yet have a "common known" partner, e.g., the participant $TN_k$ or the TA, with which they each share at least one common key, a random common key from $TN_k$ or the TA, whereby $TN_i$ and $TN_j$ can then securely communication with each other without conventional encryption methods being used at any point in time.

This makes possible the advantages that the method allows a secure transfer of any information of
  any size via an insecure channel in terms of confidentiality; and the method manages without conventional encryption
  methods; it is based exclusively on a secure key derivation function KDF, which is generally based only on
  secure one-way functions (hash functions).

As an alternative to a previously undertaken key negotiation according to the method described above, according to an advantageous development of the method according to the invention, the derivation rule DR for the key can also be sent directly with the message, part of which are protected with the newly negotiated key. Before the message is read or evaluated, this key must first be generated by the opposing side according to the derivation rule sent along with it. Here, care must be taken to ensure that the derivation rule for the key, with which the message or parts of it have been encrypted as needed, must not be transferred in encrypted form.

Thus, a random key $DR\_ENCR(SEC_{TNi}{}^{TNj})$ derived by means of a derivation rule DR_ENCR could be used to encrypt any data dat of the same bit length by using the XOR function $\oplus$. A message containing data dat encrypted by $DR\_ENCR(SEC_{TNi}{}^{TNj})$ could then look as follows, for example: $(DR\_ENCR, DR\_ENCR(SEC_{TNi}{}^{TNj}) \oplus dat)$
The data dat and the derivation rule DR_ENCR could thus here by transferred in one message.

Since no secret is contained in a derivation rule, no encryption of the messages containing a derivation rule is necessary, a secure encryption method ENCR must thus not necessarily be implemented by each participant $TN_i$, in contrast to the method described above in said DE 10 2020 003 739 A1.

If it is assumed that the secret of a participant $TN_i$ is only known to them and the Trust Authority TA, then strictly speaking no authentication of the messages containing a derivation rule DR is necessary because if an attacker succeeds in transferring a derivation rule DR' defined by the attacker to the participant $TN_i$, a possibly false key is not revealed or corrupted by the derivation and subsequent use of this. However, a key already agreed between the participant $TN_i$ and the TA for a specific purpose can thus optionally be overwritten by a false key "newly negotiated" by the attacker. However, if it is assumed that the attacker is not in possession of the used shared secret $SEC_{TNi}{}^{TNj}$ but instead transmits only a false derivation rule DR' and thus initiates the derivation and use of a new key, then they can also not read data secured or encrypted with this false key. Despite this, for reasons of system robustness, an authentication AUTH of the messages containing a derivation rule DR would be desirable for key negotiation.

If the used communication channel does not protect against manipulation of the transferred data, then a derivation rule DR_AUTH, for example, can be generated and transmitted for an additional authentication key DR_AUTH $(SEC_{TNi}{}^{TNj})$ of sufficient length, wherein this authentication key is used by $TN_i$ to authenticate the second part of the message transferred to $TN_j$, the derivation rule for $DR(SEC_{TNi}{}^{TNj})$, with a symmetrical method AUTH, e.g. an HMAC, wherein AUTH calculates the authentication stamp AUTH(symKey, dat) of a piece of data dat by means of a symmetrical key symKey. A message protected against manipulation in this way could then look as follows, for example:
$(DR, DR\_AUTH, AUTH(DR\_AUTH(SEC_{TNi}{}^{TNj}), DR))$
or
$(DR, DR\_AUTH, AUTH(DR\_AUTH(SEC_{TNi}{}^{TNj}), (DR, DR\_AUTH)))$
Should further data dat also be authenticated with $DR\_AUTH(SEC_{TNi}{}^{TNj})$, then this can also be included as follows, for example:
$(DR, DR\_AUTH, dat, AUTH(DR\_AUTH(SEC_{TNi}{}^{TNj}), (DR, DR\_AUTH, dat)))$
According to an exceptionally favorable design of the method according to the invention, the derived key $DR(SEC_{TNi}{}^{TNj})$ itself can also here be used to directly authenticate the derivation rule DR when transferring with a symmetrical method AUTH. A message protected against manipulation in this way could then look as follows, for example:
$(DR, AUTH(DR(SEC_{TNi}{}^{TNj}), DR))$
If further data dat is to be authenticated with $DR(SEC_{TNi}{}^{TNj})$, then these can here also be included as follows, for example:
$(DR, dat, AUTH(DR(SEC_{TNi}{}^{TNj}), (DR, dat)))$
In order to prevent replay attacks and other attacks, further data can be authenticated in addition to the derivation rule DR, for example the identity of the dispatching partner, e.g. $TN_i$ or TA, and/or a time stamp for verifying the currentness of the derivation rule DR. A challenge response method can also be used, by means of which the receiver, e.g., TA or $TN_i$ can then check whether the generated keys are "fresh".

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for securely negotiating symmetrical keys between at least two participants of a communication, the method comprising:

equipping the at least two participants in pairs with a common secret, wherein the at least two participants are directly equipped in pairs with the common secret or the at least two participants are indirectly equipped with the common secret via a further participant that shares the common secret with the at least two participants;

determining that a new symmetrical key or a renewed symmetrical key is required; and deriving, responsive to the determination that the new symmetrical key or the renewed symmetrical key is required, the new symmetrical key or the renewed symmetrical key based on the common secret and one of a plurality of key derivation functions according to a derivation rule, wherein the derivation rule comprises at least one of the plurality of key derivation function, an input and output selection function respectively defining a number of incoming and outgoing bits, and at least one parameter for the at least one of the plurality of key derivation functions, wherein the at least one of the plurality of key derivation functions is a key derivation function used to derive the new or renewed symmetrical key, wherein the key base of the at least one key of the plurality of derivation functions is determined using the input selection function, which selects certain bits of the common secret and leaves the selected bits in an existing order or changing the existing order of the selected bits, and a result of the input selection function is used as the key base of the at least one of the plurality of key derivation functions, wherein the at least two participants are control devices each having a secure hardware security module, and wherein the derivation rule is transmitted from a first one of the at least two participants to a second one of the at least two participants.

2. The method of claim 1, wherein the at least one of the plurality of key derivation functions uses a key base, a salt, and an output length as the at least one parameter, the key base is a secret known to the at least two participants or can be derived by a secret known to the at least two participants, the salt is a random or pseudo-random bit string of a predetermined length, and the output length is a natural number specifying a length of an output of the at least one key of the plurality of derivation functions.

3. The method of claim 2, wherein the derivation rule further comprises the salt and the output length.

4. The method of claim 3, wherein the new or renewed symmetrical key is generated by the derivation rule based on the output selection function selecting certain bits from an output of the key derivation function output length and arranging the selected certain bits in a selected order or in a new order.

5. The method of claim 3, wherein the input or output selection function operates as a rearranging selection function as defined by a sequence of bit positions.

6. The method of claim 3, wherein the input or output selection function is an order-preserving selection function as defined by a sequence of bit spacings or by bit spacings and corresponding bit quantities.

7. The method of claim 3, wherein the input or output selection function is an order-preserving selection function defined by a bit string, wherein bits of the bit string define inclusion or non-inclusion of corresponding bits in the output of the selection function.

8. The method of claim 3, wherein the derivation rule is transmitted to the second one of the at least two participants without at least one of the input and output selection functions, wherein, instead of transferring at least one of the selection functions, a reference to a common known input or output selection function is transferred.

9. The method of claim 3, wherein different regions of the common secret are used by different input selection functions.

10. The method of claim 9, wherein corresponding input selection functions are chosen for several derivation rules in such a way that selection of individual bit positions of the common secret is evenly distributed by the input selection function, or for two random different input selection functions, a number of bit positions of the common secret selected by the two input selection functions is evenly distributed.

11. The method of claim 9, wherein the bit positions of the common secret selected by a respective input selection function are set by a random or pseudo-random number generator, wherein bit positions are selected from an entirety of the common secret or from a predetermined region of the common secret.

12. The method of claim 1, wherein transferred data is symmetrically authenticated by the key defined by the derivation rule.

13. The method of claim 12, wherein the derivation rule is part of the data authenticated by the key defined by the derivation rule.

14. The method of claim 1, wherein the derivation rule is transferred as an unencrypted part of a message encrypted with the key defined by the derivation rule.

15. The method of claim 1, wherein one of the at least two participants or the further participant is a central confidential authority.

* * * * *